UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

METHOD FOR THE PRODUCTION OF ESTER-CONDENSATION PRODUCTS.

1,425,626.     Specification of Letters Patent.     Patented Aug. 15, 1922.

No Drawing.     Application filed April 29, 1921. Serial No. 465,473.

*To all whom it may concern:*

Be it known that I, ARTHUR A. BACKHAUS, a citizen of the United States, residing at Baltimore, State of Maryland, have invented certain new and useful Improvements in Methods for the Production of Ester-Condensation Products, of which the following is a specification.

My invention is concerned with the production of condensation products from esters of the aliphatic series but it is especially directed to the production of ethyl acetoacetate.

The object of my invention is to provide a process of the above character whereby large yields may be obtained with the use of a comparatively inexpensive apparatus and raw material.

Another object is to use a neutralizing agent which will be completely separated from the product of the process and will not be carried over therewith in the final distillation and which will give a high yield of the product.

In order to provide a commercial process for the production of such condensation products, I not only use reagents of the character above referred to but I remove the alcohol formed in the reaction, thus preventing the alcohol from interfering with the completion of the same.

Further objects of my invention will appear from the detailed description contained hereinafter.

The invention is capable of being carried out in various ways but by way of illustration I shall describe only certain ways of carrying out the same, hereinafter.

For example, in conducting my process I make use of a still of the usual type but which may be made of copper. Twenty-five to thirty parts by weight of acetic ether which contains approximately 99% by weight of ethyl acetate and 1% by weight of alcohol, are introduced into the still and to this there is added one part by weight of metallic sodium. Instead of the sodium I may use metallic potassium or metallic magnesium. The sodium immediately starts to react with the ethyl acetate to form the sodium compound, $CH_3CONaCHCOOC_2H_5$, and alcohol, and furthermore, the sodium forms with the alcohol sodium alcoholate with the evolution of hydrogen. The sodium alcoholate formed then acts upon the ethyl acetate to produce the same compound the formula of which is given above. The action of the sodium in this manner is accompanied with the evolution of heat and the temperature is then maintained at the boiling point so as to distill off a mixture containing 10%–30% by weight of alcohol, the remainder of the mixture being ethyl acetate. The removal of the alcohol in the form of the constant boiling mixture may take place when the sodium is being dissolved in the liquid or afterwards. The reaction between the sodium and the ethyl acetate having been completed, I add to the liquid an amount of sulfuric acid, having a strength of 10%, which is chemically equivalent to the amount of sodium present, so as to form ethyl acetoacetate and sodium sulfate. The liquid separates into two layers comprising an oily layer containing ethyl acetoacetate together with the remainder of the ethyl acetate and perhaps some alcohol, and a lower watery layer containing sodium sulfate together with any remaining ethyl alcohol. The oily layer is thereupon decanted and distilled to recover the excess ethyl acetate which boils off and is collected from the condenser. The crude ethyl acetoacetate is then placed into a vacuum still and distilled under vacuum to obtain the finished product. By the use of an acid which boils at a high temperature any excess of the same present would not be carried over in the distillation of the oily layer. Also, it is an advantage to use an acid like sulfuric acid giving a high hydrogen ion concentration so as to obtain a high yield of the condensation product. In order to recover any alcohol present in the water layer the latter may be distilled and the sodium sulfate may be secured by the evaporation of the residual liquid.

Furthermore, it is to be understood that my process may be carried out for the production of other condensation products of the same character by the treatment in the same manner of propyl acetate, ethyl propionate, ethyl butyrate, propyl propionate or propyl butyrate, or combinations of these esters.

My invention is capable of many changes without departing from the spirit thereof.

I claim:

1. A process of forming a condensation product which comprises reacting upon an ester with a metal to form a compound of the metal therewith and an alcohol, continually removing substantially all of the alcohol so as to enable the reaction to continue and then adding sulfuric acid.

2. A process of forming a condensation product which comprises reacting upon an ester with a metal to form a compound of the metal therewith and an alcohol, removing most of the alcohol mixed with a quantity of the ester forming a constant boiling mixture therewith so as to enable the reaction to continue and then adding sulfuric acid.

3. A process of forming a condensation product which comprises reacting upon an ester with a metal to form a compound of the metal therewith and an alcohol, continually removing substantially all of the alcohol mixed with a quantity of the ester forming a constant boiling mixture therewith so as to enable the reaction to continue and then adding sulfuric acid.

4. A process of forming a condensation product which comprises reacting upon an ester with a metal to form a compound of the metal therewith and an alcohol, removing most of the alcohol so as to enable the reaction to continue, then adding sulfuric acid, thereby forming an oily and a watery layer, and then decanting and distilling the oily layer to recover the condensation product.

5. A process of forming a condensation product which comprises reacting upon an ester with a metal to form a compound of the metal therewith and an alcohol, continually removing substantially all of the alcohol so as to enable the reaction to continue, then adding sulfuric acid, thereby forming an oily and a watery layer, and then decanting and distilling the oily layer to recover the condensation product.

6. A process of forming a condensation product which comprises reacting upon an ester with a metal to form a compound of the metal therewith and an alcohol, removing most of the alcohol mixed with a quantity of the ester forming a constant boiling mixture therewith so as to enable the reaction to continue, then adding sulfuric acid, thereby forming an oily and a watery layer, and then decanting and distilling the oily layer to recover the condensation product.

7. A process of forming a condensation product which comprises reacting upon an ester with a metal to form a compound of the metal therewith and an alcohol continually removing substantially all of the alcohol mixed with a quantity of the ester forming a constant boiling mixture therewith so as to enable the reaction to continue, then adding sulfuric acid, thereby forming an oily and a watery layer, and then decanting and distilling the oily layer to recover the condensation product.

8. A process of forming a condensation product which comprises reacting upon an ester with a metal to form a compound of the metal therewith and an alcohol, removing most of the alcohol so as to enable the reaction to continue, then adding sulfuric acid, thereby forming an oily and a watery layer, decanting and distilling the oily layer to recover the condensation product, and then distilling the watery layer to recover any alcohol therein.

9. A process of forming a condensation product which comprises reacting upon an ester with a metal to form a compound of the metal therewith and an alcohol, continually removing substantially all of the alcohol so as to enable the reaction to continue, then adding sulfuric acid, thereby forming an oily and a watery layer, then decanting and distilling the oily layer to recover the condensation product, and then distilling the watery layer to recover any alcohol therein.

10. A process of forming a condensation product which comprises reacting upon an ester with a metal to form a compound of the metal therewith and an alcohol, removing most of the alcohol mixed with a quantity of the ester forming a constant boiling mixture therewith so as to enable the reaction to continue, then adding sulfuric acid, thereby forming an oily and a watery layer, then decanting and distilling the oily layer to recover the condensation product, and then distilling the watery layer to recover any alcohol therein.

11. A process of forming a condensation product which comprises reacting upon an ester with a metal to form a compound of the metal therewith and an alcohol, continually removing substantially all of the alcohol mixed with a quantity of the ester forming a constant boiling mixture therewith so as to enable the reaction to continue, then adding sulfuric acid, thereby forming an oily and a watery layer, then decanting and distilling the oily layer to recover the condensation product, and then distilling the watery layer to recover any alcohol therein.

12. A process of forming a condensation product which comprises reacting upon ethyl acetate with sodium to form a compound of the sodium therewith and an alcohol, removing most of the alcohol so as to enable the reaction to continue, then adding sulfuric acid, thereby forming an oily and a watery layer, decanting and distilling the oily layer to recover the condensation product, and then distilling the watery layer to recover any alcohol therein.

13. A process of forming a condensation product which comprises reacting upon ethyl acetate with sodium to form a compound of the sodium therewith and an alcohol, continually removing substantially all of the alcohol so as to enable the reaction to continue then adding sulfuric acid, thereby forming an oily and a watery layer, then decanting and distilling the oily layer to recover the condensation product, and then distilling the watery layer to recover any alcohol therein.

14. A process of forming a condensation product which comprises reacting upon ethyl acetate with sodium to form a compound of the sodium therewith and an alcohol, removing most of the alcohol mixed with a quantity of the ethyl acetate forming a constant boiling mixture therewith so as to enable the reaction to continue, then adding sulfuric acid thereby forming an oily and a watery layer, then decanting and distilling the oily layer to recover the condensation product, and then distilling the watery layer to recover any alcohol therein.

15. A process of forming a condensation product which comprises reacting upon ethyl acetate with sodium to form a compound of the sodium therewith and an alcohol, continually removing substantially all of the alcohol mixed with a quantity of the ethyl acetate forming a constant boiling mixture therewith so as to enable the reaction to continue, then adding sulfuric acid, thereby forming an oily and a watery layer, then decanting and distilling the oily layer to recover the condensation product, and then distilling the watery layer to recover any alcohol therein.

In testimony that I claim the foregoing, I have hereunto set my hand this 26th day of April, 1921.

ARTHUR A. BACKHAUS.